(12) United States Patent
Ahn et al.

(10) Patent No.: US 8,828,602 B2
(45) Date of Patent: Sep. 9, 2014

(54) SECONDARY BATTERY WITH ELECTRODE LEADS AT AN OUTER SIDE OF A BATTERY CASE

(75) Inventors: Changbum Ahn, Yongin-si (KR); Youngbae Sohn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 497 days.

(21) Appl. No.: 12/955,842

(22) Filed: Nov. 29, 2010

(65) Prior Publication Data

US 2011/0129727 A1  Jun. 2, 2011

(30) Foreign Application Priority Data

Dec. 1, 2009 (KR) .................. 10-2009-0117578

(51) Int. Cl.
*H01M 2/08* (2006.01)
*H01M 2/26* (2006.01)
*H01M 2/06* (2006.01)
*H01M 2/30* (2006.01)
*H01M 2/02* (2006.01)

(52) U.S. Cl.
CPC *H01M 2/06* (2013.01); *H01M 2/26* (2013.01); *H01M 2/30* (2013.01); *Y02E 60/12* (2013.01); *H01M 2/0207* (2013.01); *H01M 2/266* (2013.01)
USPC ........... 429/185; 429/162; 429/163; 429/174; 429/175; 429/176; 429/178; 429/179; 429/181

(58) Field of Classification Search
CPC ....... H01M 2/0207; H01M 2/06; H01M 2/26; H01M 2/266; H01M 2/30
USPC ......... 429/162, 163, 174, 175, 176, 178, 179, 429/181, 185
See application file for complete search history.

(56) References Cited

U.S. PATENT DOCUMENTS

| 5,849,431 A | 12/1998 | Kita et al. |
| 2007/0117009 A1 | 5/2007 | Yamauchi et al. |
| 2008/0076020 A1 | 3/2008 | Wu |

(Continued)

FOREIGN PATENT DOCUMENTS

| JP | 11-026653 | 1/1999 |
| JP | 2003-151529 | 5/2003 |

(Continued)

OTHER PUBLICATIONS

KIPO Notice of Allowance dated Dec. 30, 2011, for KR patent application No. 10-2009-0117578, 5 pages.

(Continued)

*Primary Examiner* — Milton I Cano
*Assistant Examiner* — Ling R Zeng
(74) *Attorney, Agent, or Firm* — Christie, Parker & Hale, LLP

(57) ABSTRACT

A secondary battery including: an electrode assembly including a plurality of first and second electrode plates and a plurality of separators between the first and second electrode plates; a first electrode tab on each of the first electrode plates; a second electrode tab on each of the second electrode plates; a case housing the electrode; and first and second electrode leads at an outer side of the case and electrically coupled to the first and second electrode tabs, respectively, wherein the first and second electrode leads and the first and second electrode tabs are respectively electrically coupled by bolts.

17 Claims, 6 Drawing Sheets

(56) References Cited

U.S. PATENT DOCUMENTS

| | | | |
|---|---|---|---|
| 2008/0213657 A1* | 9/2008 | Qi et al. | ......... 429/178 |
| 2008/0254348 A1 | 10/2008 | Hatta et al. | |
| 2008/0268344 A1 | 10/2008 | Kim et al. | |
| 2009/0023062 A1 | 1/2009 | Kim | |
| 2009/0047575 A1* | 2/2009 | Abe et al. | ......... 429/163 |
| 2010/0173194 A1 | 7/2010 | Fujiya et al. | |

FOREIGN PATENT DOCUMENTS

| | | |
|---|---|---|
| JP | 2004-273320 A | 9/2004 |
| JP | 2005-005215 A | 1/2005 |
| JP | 2007-149353 A | 6/2007 |
| JP | 2008-262804 | 10/2008 |
| JP | 2009-260086 | 11/2009 |
| JP | 2011-026653 | 1/2011 |
| JP | 2011-86760 A | 4/2011 |
| KR | 10-2007-0049255 * | 5/2007 |
| KR | 2007-0049255 A | 5/2007 |
| KR | 10-0770097 | 10/2007 |
| KR | 10-2008-0096165 | 10/2008 |
| KR | 10-2009-0008869 | 1/2009 |
| KR | 10-2009-0051132 | 5/2009 |
| WO | WO 2009013796 A1 | 1/2009 |
| WO | WO 2009/038320 A1 | 3/2009 |

OTHER PUBLICATIONS

Extended European Search Report, dated Feb. 16, 2011, issued by the EPO, Application No. 10193321.6, 6 pages.
English Machine Translation of JP 2009-260086, 30 pages.
English Machine Translation of JP 2011-86760 A, 23 pages.
Japan Office action for JP 10-127650 dated Aug. 21, 2012, 2 pages.
KIPO Office action dated Apr. 13, 2011, for Korean priority Patent application 10-2009-0117578, noting listed reference in this IDS.

* cited by examiner

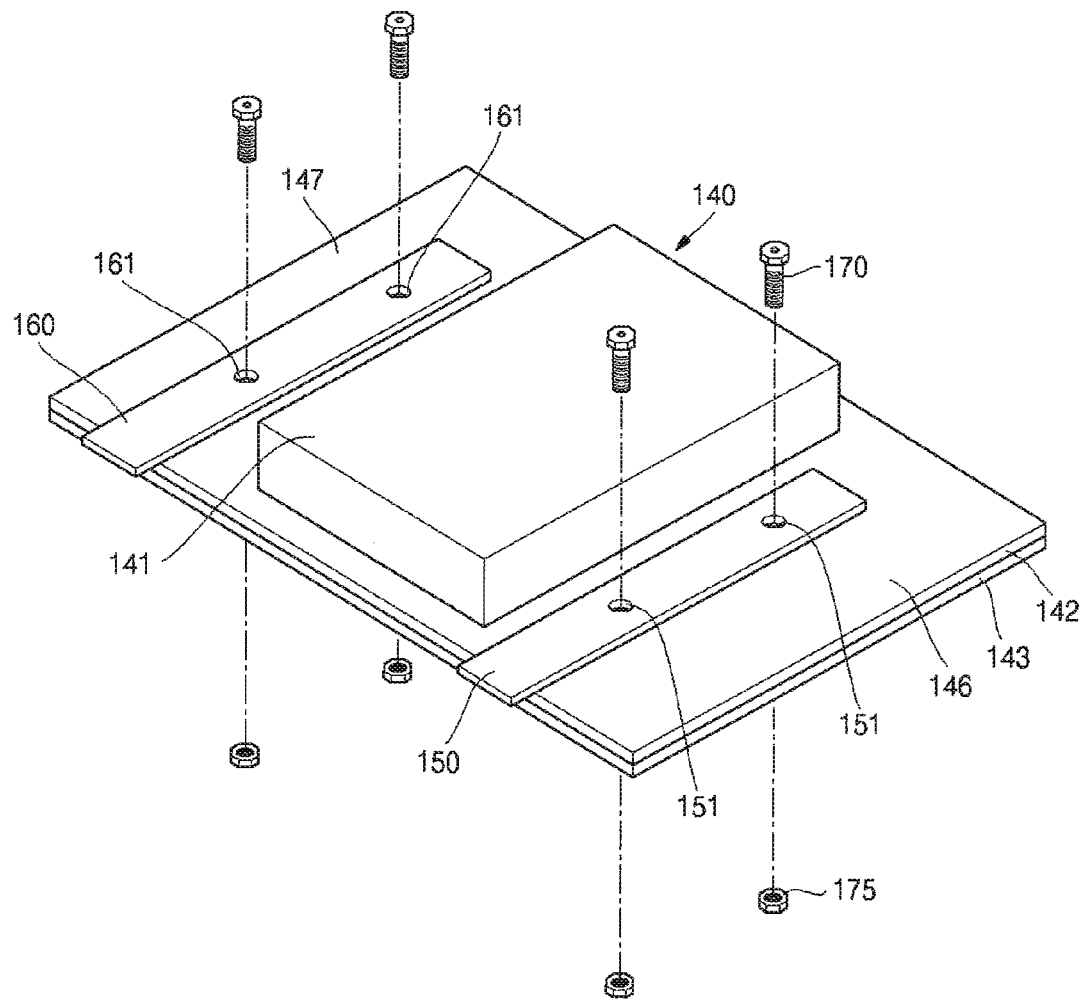

SECONDARY BATTERY WITH ELECTRODE LEADS AT AN OUTER SIDE OF A BATTERY CASE

CROSS-REFERENCE TO RELATED APPLICATIONS

This application claims priority to and the benefit of Korean Patent Application Serial No. 2009-0117578, filed on Dec. 1, 2009, in the Korean Intellectual Property Office, the entire content of which is incorporated herein by reference.

BACKGROUND

1. Field

One or more embodiments of the present invention relate to a secondary battery.

2. Description of the Related Art

Secondary batteries have been esteemed as power sources for a variety of electronic and communication devices as they are rechargeable and portable.

In typical secondary batteries, an electrode assembly, having electrode plates and separators that are alternately stacked and selectively rolled up, is mounted in a case. An electrode tab is attached to the respective electrode plates of the electrode assembly. When the electrode assembly is mounted in the case, an end portion of the electrode tab protrudes out of the case and is electrically connected to an electrode lead.

The case is designed such that an edge thereof, except for a portion through which the electrode tab protrudes, is sealed. At this point, although a sealing film is interposed between the case and the electrode tab, a rate of defective products caused by an electrolyte leak or a gas leak is still high.

In addition, the protruding end portion of the electrode tab is coupled to the electrode lead and takes up a separate space. That is, the electrode tab and the electrode lead extend by a length to be capable of being welded to each other, and thus a separate space, in which the electrode tab and the electrode lead that are welded to each other can be disposed, is required. For a high capacity battery, the separate space takes up about 15-30% of the space of the battery pack. Therefore, the structure where the electrode tab and the electrode lead are coupled to each other at an external side of the case causes the capacity of the battery to be reduced.

Furthermore, the electrode tab and the electrode lead are coupled to each other by welding. The welding portion may easily contact other components or may be easily damaged by external impacts. This causes the battery to be defective.

SUMMARY

An aspect of embodiments of the present invention is directed toward a secondary battery that is configured to improve a sealing property of a case by allowing an electrode tab to be fully received in the case.

Another aspect of embodiments of the present invention is directed toward a secondary battery that is configured to enlarge a capacity thereof by allowing an electrode tab to be fully received in a case.

Another aspect of embodiments of the present invention is directed toward a secondary battery that is designed to ensure mechanical safety at a coupling portion of an electrode tab and an electrode lead by coupling the electrode tab and the electrode lead using a bolt coupling method.

An embodiment of the present invention provides a secondary battery including: an electrode assembly including a plurality of first and second electrode plates and a plurality of separators between the first and second electrode plates; a first electrode tab on each of the first electrode plates; a second electrode tab on each of the second electrode plates; a case housing the electrode; and first and second electrode leads at an outer side of the case and electrically coupled to the first and second electrode tabs, respectively, wherein the first and second electrode leads and the first and second electrode tabs are respectively electrically coupled by bolts.

The bolts may include at least one first bolt that passes through the first electrode leads and the first electrode tabs, and at least one second bolt that passes through the second electrode leads and the second electrode tabs.

The bolts may pass through the case and may be coupled to nuts.

Sealing layers may be between the case and the first electrode tab, and between the case and the second electrode tab.

The sealing layers may include tapes.

The sealing layers may include an insulation material.

The sealing layers may include double-sided tapes.

The sealing layers may be coated on inner surfaces of the case.

The sealing layers may be coated on outer surfaces of the first and second electrode tabs.

The sealing layers may include through holes adapted to receive the bolts.

The secondary battery as claimed in claim 10, wherein the through holes comprise a diameter equal to or less than a diameter of each of the bolts.

The first and second electrode tabs may include through holes adapted to receive the bolts.

The case may include a first sheet comprising an internal space adapted to receive the electrode assembly and a second sheet sealed with an edge of the first sheet.

The first sheet may include first and second through holes, and the second sheet may include first and second through holes corresponding to the first and second through holes of the first sheet.

The diameter of the first and second holes of the first and second sheets may be greater than a diameter of each of the bolts.

The first and second electrode leads may be provided with through holes adapted to receive the bolts.

The first electrode lead may include a same material as the first electrode tab, and the second electrode lead comprises a same material as the second electrode tab.

The bolts may include a hexagonal-head bolt, a rectangular-head bolt, or a circular-head bolt.

The plurality of first electrodes, the plurality of separators, and the plurality of second electrodes may be sequentially stacked.

The first and second electrode tabs may be coupled to opposite sides of the first and second electrode plates.

The case may include a pouch-type case.

The first and second electrode leads may be folded to contact side surfaces of the case.

BRIEF DESCRIPTION OF THE DRAWINGS

The accompanying drawings, together with the specification, illustrate exemplary embodiments of the present invention, and, together with the description, serve to explain the principles of the present invention.

FIGS. 5A, 5B, 5C, 5D, and 5E illustrate views showing sequential processes for assembling a secondary battery according to an embodiment of the present invention.

DETAILED DESCRIPTION

Figure 1:
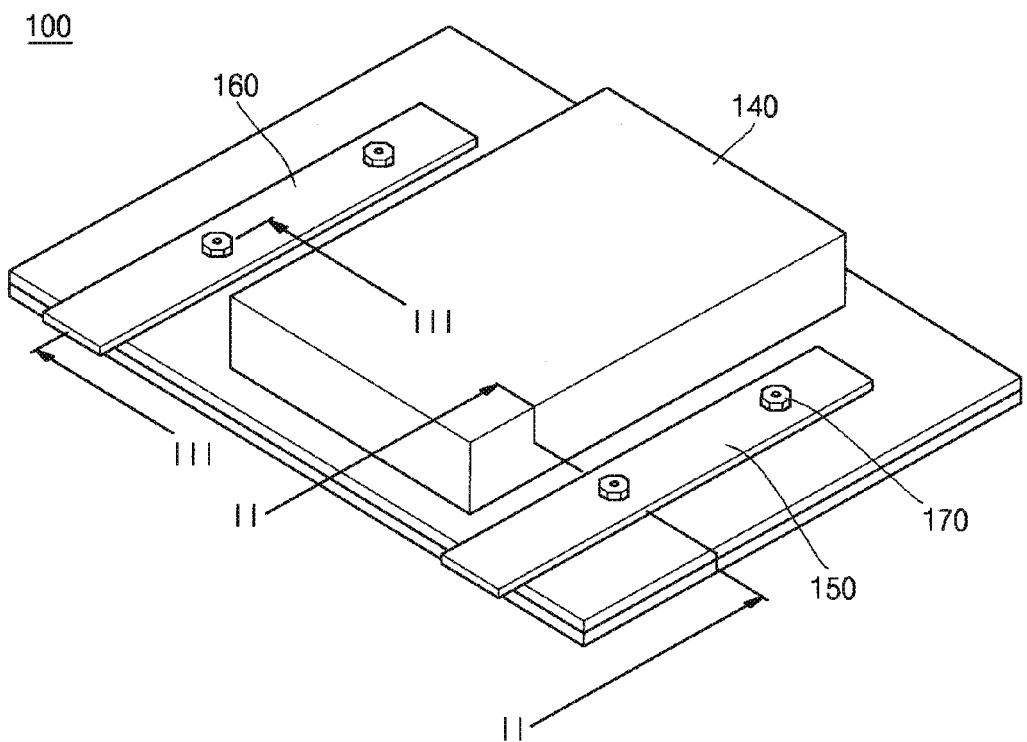
FIG. 1 illustrates a perspective view of a secondary battery according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

In the drawings, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
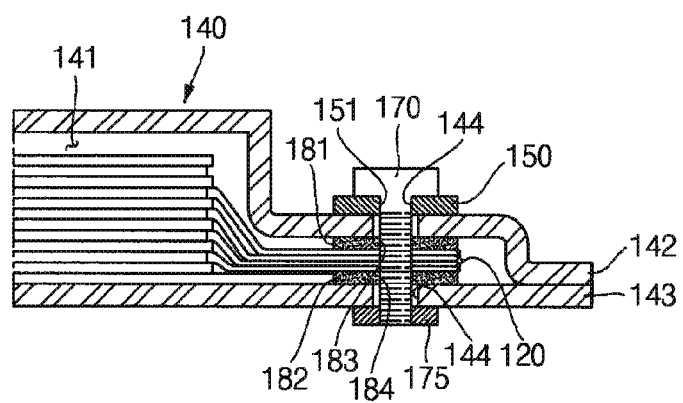
FIG. 2 illustrates a cross-sectional view taken along line II-II of FIG. 1.
Figure 3:
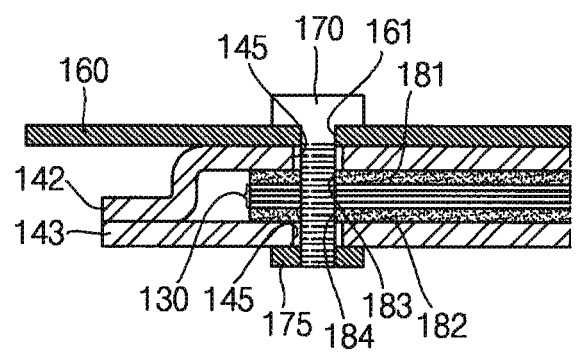
FIG. 3 illustrates a cross-sectional view taken along line of FIG. 1.
Figure 4:
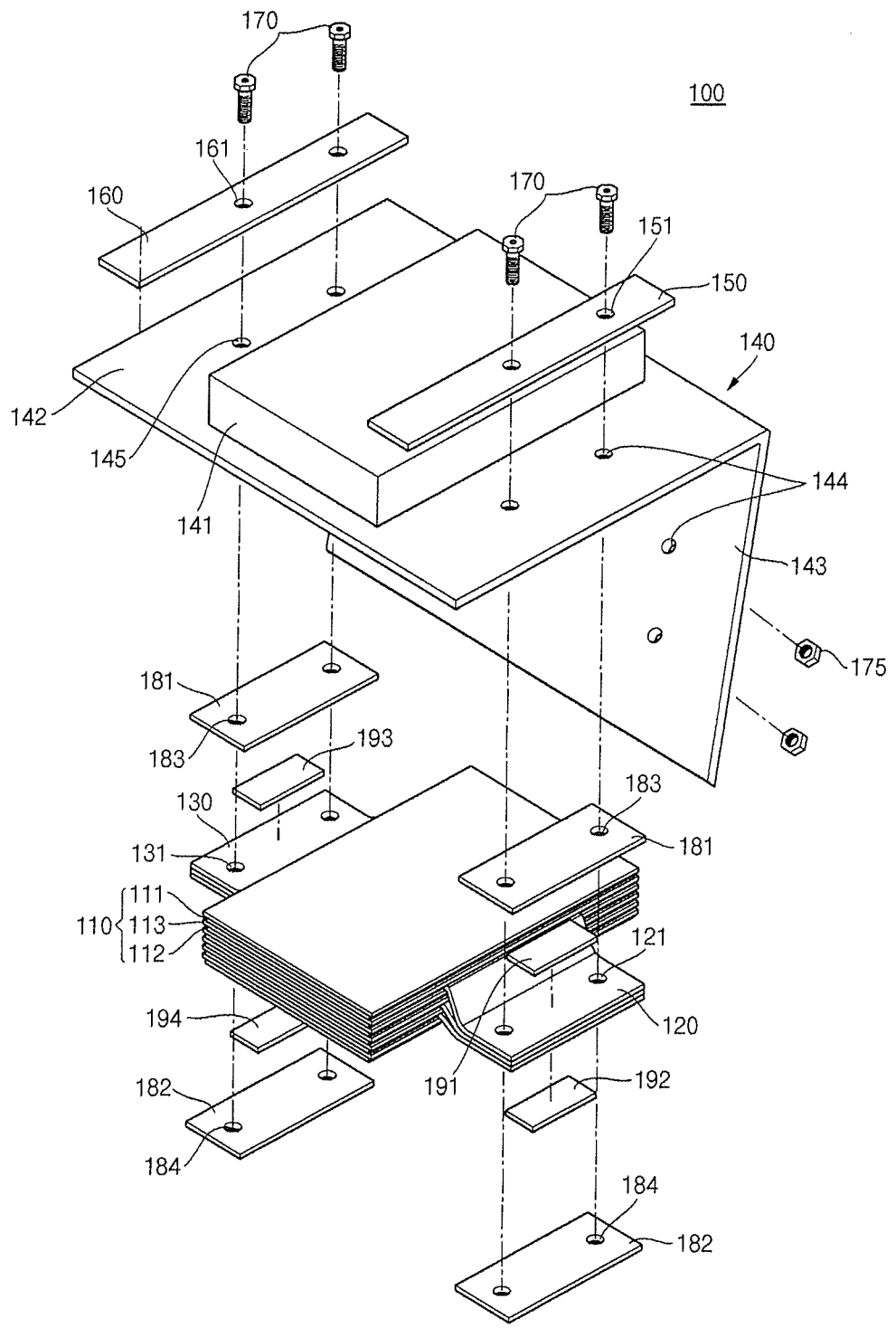
FIG. 4 illustrates an exploded perspective view of a secondary battery according to an embodiment of the present invention.

FIG. 1 illustrates a perspective view of a secondary battery according to an embodiment of the present invention, FIG. 2 illustrates a cross-sectional view taken along line II-II of FIG. 1, FIG. 3 illustrates a cross-sectional view taken along line III-III of FIG. 1, and FIG. 4 illustrates an exploded perspective view of a secondary battery according to an embodiment of the present invention.

Referring to FIGS. 1 to 4, a second battery 100 according to an embodiment includes an electrode assembly 110 having a plurality of positive electrode plates 111 and a plurality of negative electrode plates 112 that are alternately stacked, and a plurality of separators 113 interposed between the positive electrode plates 111 and the negative electrode plates 112, a positive electrode tab assembly 120 having a plurality of positive electrode tabs attached to the respective positive electrode plates 111, a negative electrode tab assembly 130 having a plurality of negative electrode taps attached to the respective negative electrode plates 112, a pouch-type case (hereinafter, referred to as "pouch") 140 that is sealed in a state where the electrode assembly 110 is mounted therein, and positive electrode and negative electrode leads 150 and 160 that are installed at an external side of the pouch 140 and connected to the positive and negative electrode tab assemblies 120 and 130, respectively.

The positive and negative electrode tab assemblies 120 and 130 are electrically coupled to the respective positive electrode and negative electrode leads 150 and 160 by a mechanical coupling method using bolts 170. As shown in the drawings, the positive and negative electrode tab assemblies 120 and 130 may be electrically coupled to the respective positive electrode and negative electrode leads 150 and 160 by the bolts 170 in a state where they, together with the electrode assembly 110, are fully received in the pouch 140. However, the present invention is not limited to this. That is, if necessary, the positive and negative electrode tab assemblies 120 and 130 may be electrically coupled to the respective positive electrode and negative electrode leads 150 and 160 by the bolts 170 even when they are partly or fully exposed to the external side.

The electrode assembly 110 is a stack-type electrode assembly in which the plurality of the positive electrode plates 111 and the plurality of the negative electrode plates 112 are alternately stacked, and the plurality of the separators 113 are interposed between the positive electrode and negative electrode plates 111 and 112. This stack-type electrode assembly is suitable for realizing a large capacity battery. The positive electrode plate 111 includes a positive electrode collector having a coated part on which a positive electrode active material is coated and an uncoated part on which no active material is coated. The separator 113 is located between the positive electrode and negative electrode plates 111 and 112. The separator 113 may be formed of any materials that can enable electrons to travel. The separator 113 may be formed in a single layer or multiple porous layers formed of polyethylene, polypropylene, or the like.

Although the stack-type electrode assembly is used in this example embodiment, the present invention is not limited to this. That is, a jellyroll-type electrode assembly in which electrodes and separators are stacked and rolled up may be also applied.

At least one positive electrode tab of the positive electrode tab assembly 120 is attached to each of the positive electrode plates 111. At least one negative electrode tab of the negative electrode tab assembly 120 is attached to each of the negative electrode plates 112. The positive and negative electrode tab assemblies 120 and 130 are respectively attached to opposite sides of the electrode assembly 110 to lead out in opposite directions to each other. In the secondary battery according to an embodiment of the present invention, the positive and negative electrode tab assemblies 120 and 130 are designed to have relatively wide widths to realize a large capacity. Since the positive and negative electrode tab assemblies 120 and 130 are respectively attached to the opposite sides of the electrode assembly 110 having the positive electrode and negative electrode plates 111 and 112 that are alternately stacked, there is no interference between the positive and negative electrode tab assemblies 120 and 130. Accordingly, the widths of the positive and negative electrode tab assemblies 120 and 130 can be enlarged to be suitable for a large capacity battery. However, the positive and negative electrode tab assemblies 120 and 130 may be attached to the positive electrode and negative electrode plates to lead out in the same direction depending on a manufacturing condition of the battery.

Two through holes 121 in which bolts 170 are inserted are formed side by side in the positive electrode tab assembly 120. Two through holes 121 in which bolts 170 are inserted are formed side by side in the negative electrode tab assembly 130.

The electrode assembly 110 is received in the pouch 140. The pouch 140 includes a first sheet 142 defining an internal space 141 in which the electrode assembly 110 can be disposed, and a second sheet 143 having one side that is integrally formed with one side of the first sheet 142 and three sides that are sealed with corresponding three sides of the first sheet 142. Therefore, after the electrode assembly 110 is received in the internal space 141 of the first sheet 142, the edges of the second sheet 143 are sealed to define the pouch 140. Alternatively, two separated sheets may be used. In this case, four sides of one sheet are sealed with the corresponding four sides of the other sheet.

Each of the first and second sheets 142 and 143 of the pouch 140 is formed with three laminated film layers. That is, an inner film layer may be formed of thermoplastic resin that has a suitable (or excellent) anti-electrolytic property, such as polyethylene, polyamide, and polypropylene. An outer film layer may be formed of insulation resin that has a suitable (or excellent) electric insulation property, such as polyester-based resin and polyamide-based resin. An intermediate film layer between the inner and outer film layers may be formed of metal that has suitable (or excellent) flexibility and strength, such as aluminum and stainless steel. However, the structures of the first and second sheets 142 and 143 are not limited to the above-described structure having the three film layers. Each of the sheets 142 and 143 may be formed with two, four, or more film layers.

Each of the first and second sheets 142 and 143 are provided with first and second through holes 144 and 145 in which the respective bolts 170 are inserted. That is, two first through holes 144 are formed through a first side portion of the first sheet 142 and two second through holes 145 are formed through a second side portion of the first sheet 142. Two first through holes 144 are formed through a first side portion of the second sheet 143 and two second through holes 145 are formed through a second side portion of the second sheet 143. The first and second through holes 144 and 145 of the first sheet 142 correspond to the first and second through holes 144 and 145 of the second sheet 143 when the first and second sheets 144 and 145 are sealed with each other. A diameter of each of the first and second through holes 144 and 145 may be greater than a diameter of the bolt 170 to reduce the likelihood of the intermediate film layer formed of the metal contacting the bolt 170 or prevent the intermediate film layer from contacting the bolt 170, and reduce the likelihood of the pouch 140 being damaged or prevent the pouch 140 from being damaged in the course of the insertion of the bolt 170.

The positive electrode and negative electrode leads 150 and 160 are respectively installed on outer surfaces of first and second side portions, respectively, of the pouch 140. The positive electrode lead 150 is installed to correspond to the positive electrode tab assembly 120, and the negative electrode lead is installed to correspond to the negative electrode tab assembly 130. Each of the positive electrode and negative electrode leads 150 and 160 is provided with through holes 151 and 161 in which the bolts 170 are inserted.

The through holes 121 of the positive electrode tab assembly 120 are formed to correspond to the first through holes 144 of the first and second sheets 142 and 143 of the pouch 140, and the through holes 151 of the positive electrode lead 150. The through holes 131 of the negative electrode tab assembly 130 are formed to correspond to the second through holes 145 of the first and second sheets 142 and 143 of the pouch 140, and the through hole 161 of the negative electrode lead 160. The bolts 170 pass through the through holes 121, 131, 151, and 161, in the pouch 140 in a vertical direction.

The positive electrode lead 150 is formed of the same material as the positive electrode tab assembly 120. For example, the positive electrode lead 150 may be formed of aluminum or an aluminum alloy. However, the present invention is not limited to this. The negative electrode lead 160 may be formed of the same material as the negative electrode tab assembly 130. For example, the negative electrode lead 160 may be formed of copper, stainless steel, and/or nickel. However, the present invention is not limited to this.

The bolts 170 may be hexagonal, rectangular, or circular head bolts. However, the present invention is not limited to this. The bolts 170 pass through the electrode leads 150 and 160, the first sheet 142 of the pouch 140, the positive and negative electrode tab assemblies 120 and 130, and the second sheet 143. End portions of the bolts 170 are coupled to nuts 175 at an external side of the second sheet 143.

Sealing layers 181 are formed between the first sheet 142 of the pouch 140 and the positive electrode tab assembly 120, and between the first sheet 142 and the negative electrode tab assembly 130. In addition, sealing layers 182 are formed between the positive electrode tab assembly 120 and the second sheet 143 of the pouch 140, and between the negative electrode tab assembly 130 and the second sheet 143 of the pouch 140. The sealing layers 181 and 182 may be provided in the form of tapes. In this case, there is an effect of simplifying the manufacturing process. The tapes are formed of an insulation material so that the sealing layers 181 and 182 can provide sealing and insulation effects. In addition, the tapes may be double-sided tapes. In this case, first surfaces of the double-sided tapes are attached to inner surfaces of the first and second sheets 142 and 143, and second surfaces of the double-sided tapes are attached to outer surfaces of the positive and negative electrode tab assemblies 120 and 130. The sealing layers 181 and 182 provided in the form of the tapes are provided with through holes 183 and 184 through which the bolts 170 passes. A diameter of each of the through holes 183 and 184 may be equal to or slightly less than a diameter of the bolt 170 to enhance a sealing property between the bolts 170 and the sealing layers 181 and 182.

The sealing layers 181 and 182 may be formed on the outer surfaces of the positive and negative electrode tab assemblies 181 and 182 and/or the inner surfaces of the first and second sheets 142 and 143 of the pouch 140 through a coating process.

By forming the sealing layers 181 and 182 as described above, the electrolyte and gas leaks through the first and second holes 140 and 144 can be reduced or prevented.

The following will describe a manufacturing process of the secondary battery structured as described with reference to FIGS. 5A to 5E.

Figure 5A:
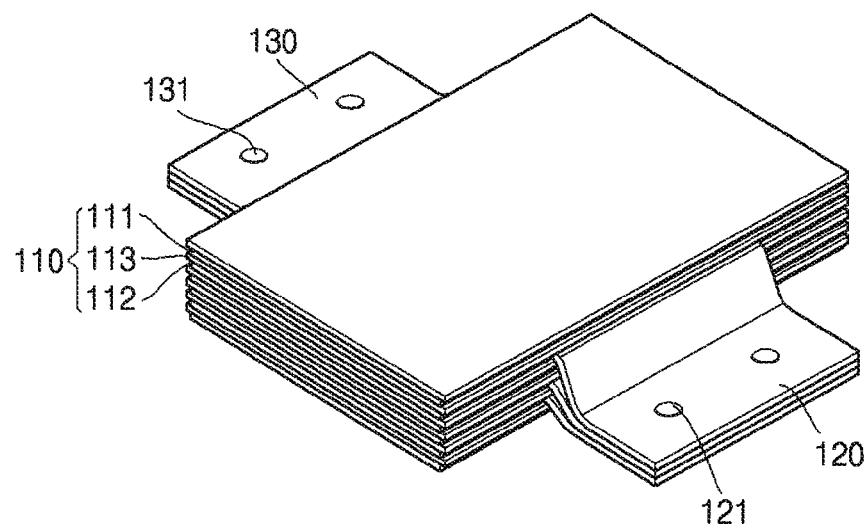

Referring first to FIG. 5A, the electrode assembly 110, having the positive electrode and negative electrode plates 111 and 112 that are alternately stacked with the separators 113 located between the positive electrode and negative electrode plates 111 and 112, is first manufactured. The positive electrode tabs of the positive electrode tab assembly 120 are attached to the positive electrode plates 111, and the negative electrode tabs of the negative electrode tab assembly 130 are attached to the negative electrode plates 112. At this point, the positive and negative electrode tab assemblies 120 and 130 are attached to the opposite sides of the electrode assembly 110. The through holes 121 are formed in the positive electrode tab assembly 120, and the through holes 131 are formed in the negative electrode tab assembly 130.

Figure 5B:
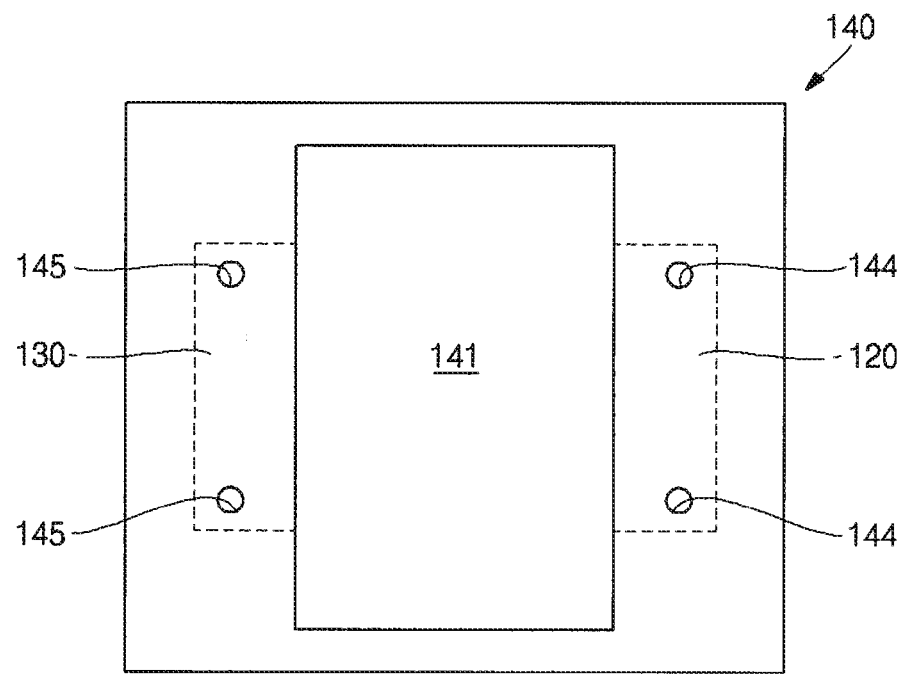

Referring to FIG. 5B, the electrode assembly 110 is received in the internal space 141 of the pouch 140 and the three sides of the first sheet 142 are sealed with the corresponding three sides of the second sheet 143 such that the first through holes 144 of the first and second sheets 142 and 143, and the second through holes 145 of the first and second sheets 142 and 143, can be aligned with each other.

Referring to FIG. 5C, the positive electrode and negative electrode leads 150 and 160 are disposed on surfaces of edge (or side) portions 146 and 147, respectively, of the pouch 140. In this state, the positive electrode and negative electrode leads 150 and 160 are coupled to the pouch 140 by the bolts 170 and the nuts 175.

That is, the bolts 170 pass through the first and second through holes 144 and 145 of the first sheet 142 of the pouch 140 after passing through the positive electrode and negative electrode leads 150 and 160. At this point, since the diameters of the first and second through holes 144 and 145 of the first sheet 142 are greater than the diameters of the bolts 170, the pouch 140 is not damaged by the bolts 170. The bolts 170 further pass through the through holes 121 and 131 of the positive and negative electrode tab assemblies 120 and 130. The bolts 170 further pass through the first and second through holes 144 and 145 of the second sheets 143, and are coupled to the nuts 175 at the external side of the second sheet 143.

Figure 5D:
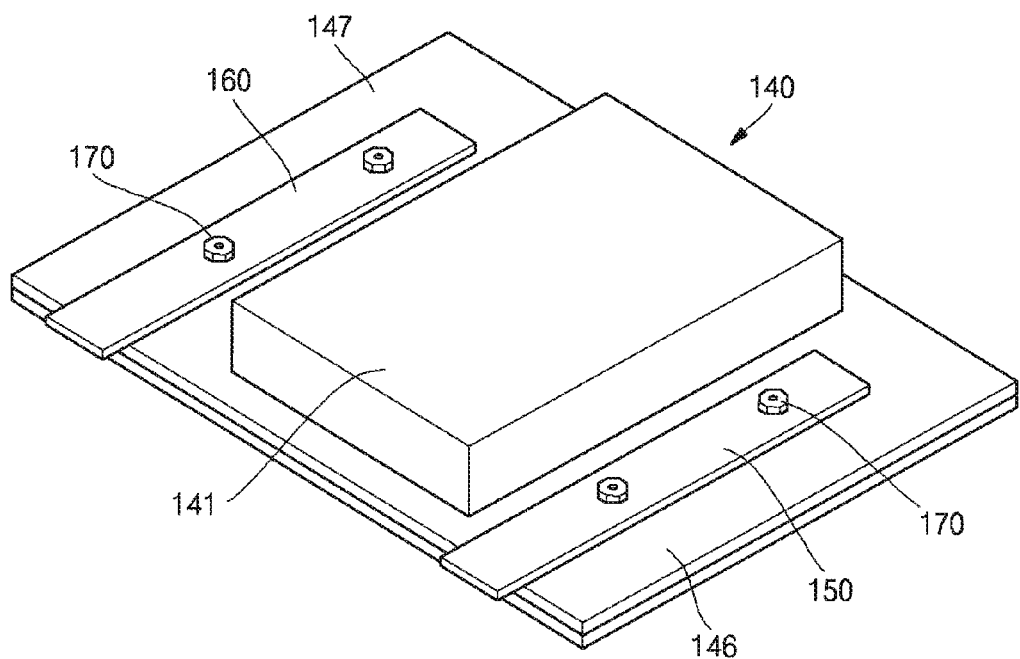

Referring to FIG. 5D, the positive electrode and negative electrode leads 150 and 160 are fixed on the surfaces of the edge portions 146 and 147 of the pouch 140 by the bolts 170. Referring again to FIGS. 2 and 3 to describe this structure, the electrolyte and gas leaks of the pouch can be reduced or prevented by the sealing layers 181 and 182 formed between the first and second sheets 142 and 143 and the positive and negative electrode tab assemblies 120 and 130. In addition, the current generated by the electrode assembly 110 can flow to the positive electrode and negative electrode leads 150 and 160 through the bolts 170 coupled to the positive and negative electrode tab assemblies 120 and 130.

Figure 5E:
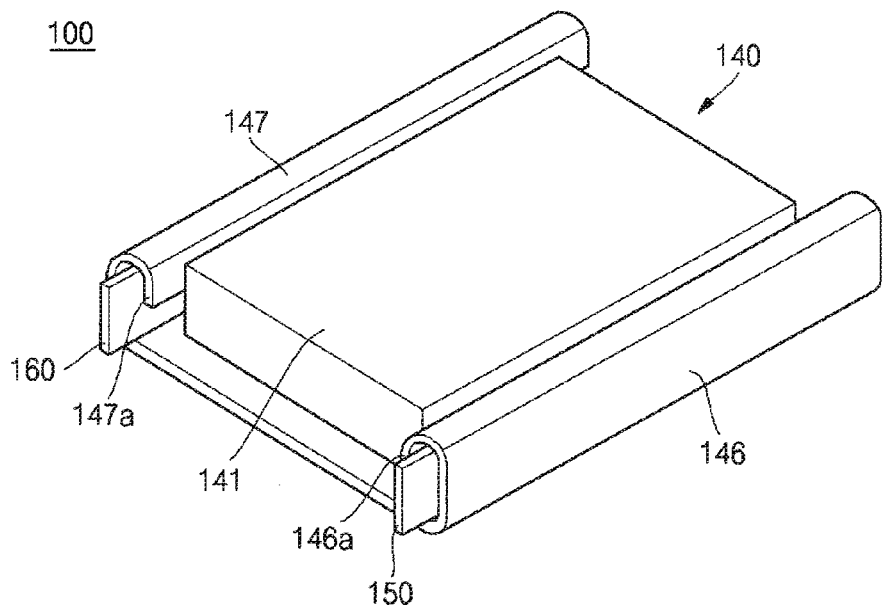

Finally, as shown in FIG. 5E, the left and right edge portions 146 and 147 are folded (or bent) to cover the positive electrode and negative electrode leads 150 and 160, respectively. Next, the positive electrode and negative electrode leads 150 and 160 are folded (or elected) vertically (or towards the pouch 140). Then, end portions 146a and 147a of the left and right edge portions 146 and 147 are located to face opposite outer surfaces of the internal space 141 of the pouch 140. In addition, the positive and negative electrode leads 150 and 160 are substantially completely enclosed (or encompassed) by the edge portions 146 and 147. Accordingly, the positive electrode and negative electrode leads 150 and 160 are in an upright position. Further, the positive electrode and negative electrode leads 150 and 160 closely contact the opposite outer surfaces of the internal space 141 of the pouch 140. As a result, an overall size of the battery can be reduced. Especially, when this structure is applied to the high capacity battery, the area taken by the battery can be minimized.

When the positive electrode and negative electrode leads 150 and 160 are electrically coupled to external terminals, the current generated in the electrode assembly 110 disposed in the pouch 140 can be supplied to an external side.

As shown in FIG. 4, in the meantime, the secondary battery according to an embodiment of the present invention may further comprise reinforcing sheets 191, 192, 193 and 194 for the positive and negative electrode tab assemblies 120 and 130. Here, the above reinforcing sheets 191, 192 and 193 and 194 are not illustrated in FIG. 2 and FIG. 3, but shown in only FIG. 4.

The electrode tab constituting each of the positive and negative electrode tab assemblies 120 and 130 is made of flexible material, and so the positive and negative electrode tab assemblies 120 and 130 can be deformed when the assembling process utilizing the bolts 170 and the nuts 175 is performed and the through holes 121, 131 are formed on the positive and negative electrode tab assemblies 120, 130.

In order to prevent the positive and negative electrode tab assemblies 120, 130 from being deformed, the reinforcing sheets 191, 192 may be attached on both outer surfaces of the positive electrode tab assembly 120 by the well known method/mean (for example, a welding process), and the reinforcing sheets 193, 194 may be attached on both outer surfaces of the negative electrode tab assembly 130 by the well known method/mean (for example, a welding process).

As a result, the reinforcing sheet is (for example, 191) disposed between each sealing layer 181 and an outer surface of each electrode tab assembly (for example 120).

Preferably, each of the reinforcing sheets 191, 192 and 193, 194 has a strength by which the reinforcing sheet can not be bent or deformed against a certain external force. In addition, each of the reinforcing sheets 191, 192 (193, 194) is preferably disposed between two the through holes 121 (131) formed on the electrode tap assembly 120 (130). Due to the above arrangement, the bolt 170 may be passed through the through hole 121 (131) without being disturbed.

Even though FIG. 4 shows that two reinforcing sheets 191 and 192 (193 and 194) are placed on both surfaces of the electrode tab assembly 120 (130), respectively, the present invention is not limited thereto. For example, only one reinforcing sheet may be placed on any one of the both outer surfaces of the electrode tap assembly.

In a secondary battery according to an embodiment of the present invention, an electrolyte leak between the electrode tab and the case can be reduced or prevented. Therefore, an overall sealing state of the case can be enhanced.

In addition, since the electrode tab is coupled to the electrode lead in a state where it is received in the case, there is no need to provide an installation space for the electrode tab and the electrode lead. Accordingly, the capacity of the battery can be increased by about 10-30%.

Further, since the electrode tab and the electrode lead are coupled to each other by the bolts, the coupling force between the electrode lead and the electrode tab can be enhanced. Accordingly, the separation of the electrode tab from the electrode lead can be reduced or prevented.

Furthermore, a thickness of the electrode tab can be increased to a degree required in the high power battery.

While aspects of the present invention have been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:
1. A secondary battery comprising:
an electrode assembly comprising at least one first electrode plate, at least one second electrode plate and at least one separator between the first and second electrode plates;
at least one first electrode tab, the first electrode tab having a through hole and being connected to the first electrode plate;
at least one second electrode tab, the second electrode tab having at least two through holes and being connected to the second electrode plate;
a case housing the electrodes;
first and second electrode leads at an outer side of the case, the first and second electrode leads each having at least two through holes and being electrically coupled to the first and second electrode tabs, respectively, wherein the first and second electrode leads and the first and second electrode tabs are respectively electrically coupled in the case by bolts passing through the case and through respective ones of the through holes of the first and second electrode tabs;
a sealing layer between the case and the first electrode tab and between the case and the second electrode tab; and at least one reinforcing sheet located between two through holes of one of the first and second electrode tabs and directly contacting the sealing layer and one of the first and second electrode tabs.

2. The secondary battery as claimed in claim 1, wherein the bolts comprise at least one first bolt that passes through the first electrode leads and the first electrode tabs, and at least one second bolt that passes through the second electrode leads and the second electrode tabs.

3. The secondary battery as claimed in claim 1, wherein the bolts pass through the case and are coupled to nuts outside the case.

4. The secondary battery as claimed in claim 1, wherein the sealing layers comprise one of tapes, an insulation material and double-sided tapes.

5. The secondary battery as claimed in claim 1, wherein the sealing layers are coated on inner surfaces of the case.

6. The secondary battery as claimed in claim 1, wherein the sealing layers are coated on outer surfaces of the first and second electrode tabs.

7. The secondary battery as claimed in claim 1, wherein the sealing layers comprise through holes adapted to receive the bolts.

8. The secondary battery as claimed in claim 7, wherein the through holes comprise a diameter equal to or less than a diameter of each of the bolts.

9. The secondary batter as claimed in claim 1, wherein the case comprises a first sheet comprising an internal space adapted to receive the electrode assembly and a second sheet sealed with an edge of the first sheet.

10. The secondary battery as claimed in claim 9, wherein the first sheet comprising first and second through holes, and the second sheet comprises first and second through holes corresponding to the first and second through holes of the first sheet.

11. The secondary battery as claimed in claim 9, wherein the electrode lead, the first sheet, the electrode tab and the second sheet are sequentially stacked and coupled to each other by the bolt and nut.

12. The secondary battery as claimed in claim 10, wherein the diameter of the first and second holes of the first and second sheets is greater than a diameter of each of the bolts.

13. The secondary battery as claimed in claim 1, wherein the first electrode lead comprises a same material as the first electrode tab, and the second electrode lead comprises a same material as the second electrode tab.

14. The secondary battery as claimed in claim 1, wherein the plurality of first electrodes, the plurality of separators, and the plurality of second electrodes are sequentially stacked.

15. The secondary battery as claimed in claim 1, wherein the first and second electrode tabs are coupled to opposite sides of the first and second electrode plates and extended in opposite directions.

16. The secondary battery as claimed in claim 1, wherein the case comprises a pouch-type case.

17. The secondary battery as claimed in claim 1, wherein the first and second electrode leads are folded to contact side surfaces of the case.

* * * * *